May 23, 1939.  H. SELIGER ET AL  2,159,910
APPARATUS FOR THE THERMAL PRODUCTION OF VOLATILIZABLE
METALS, PARTICULARLY OF MAGNESIUM
Filed March 23, 1938
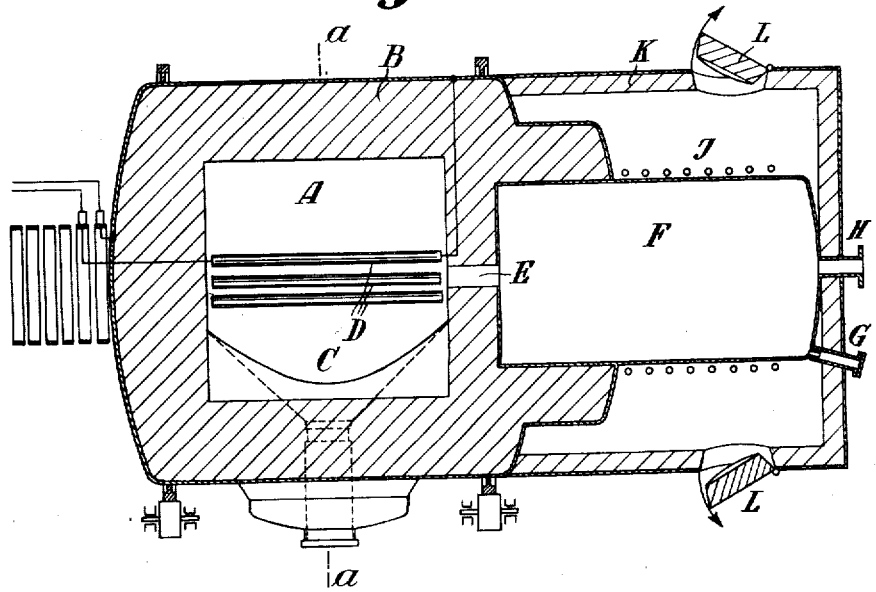
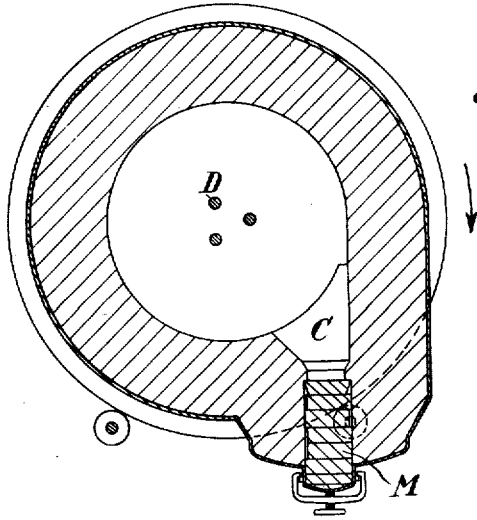
Inventor
Hellmuth Seliger, Otto Bretschneider, Bernard Hubald,
Willy Krüger and Georg Truglitzka
By his Attorney Patented May 23, 1939

2,159,910

UNITED STATES PATENT OFFICE 2,159,910

APPARATUS FOR THE THERMAL PRODUCTION OF VOLATILIZABLE METALS, PARTICULARLY OF MAGNESIUM

Hellmuth Seliger, Otto Bretschneider, Bernhard Hubald, Willy Krüger, and Georg Truglitzka, Bitterfeld, Germany, assignors, by mesne assignments, to Magnesium Development Corporation, a corporation of Delaware Application March 23, 1938, Serial No. 197,682
In Germany March 27, 1937

4 Claims. (Cl. 13—21)

This invention relates to an improved apparatus for the thermal production of volatilizable metals particularly of magnesium.

Numerous widely differing types of furnaces have already been proposed for use in the thermal production of magnesium by the reduction of magnesiferous raw materials with the aid of silicon, aluminium or similar reducing agents furnishing non-gaseous oxidation products. All these types of furnaces, however, have the drawback of being unsuitable for carrying out the process on a large commercial scale, because the peculiar physical conditions under which the process must be carried out, are found to become more difficult to meet when increasing the size of the apparatus to an extent sufficient to yield the desired output. Thus, when the process is carried out at atmospheric pressure, for example in an atmosphere of hydrogen, most structural materials are no longer able to withstand the stresses set up at the high temperatures obtaining during the reduction, when the furnace is of relatively large dimensions. When however, the process is carried out in a high vacuum at correspondingly lower temperatures, the problem arises of designing the various parts of the apparatus so as to enable such vacuum to be maintained which further entails the provision of lock chambers or the like for the introduction of the charge into the furnace and the discharge of the solid reaction residues and the resulting metal. This charging and discharging becomes yet more difficult when the reaction mixture has to be agitated during the treatment for example in a rotary furnace. From the point of view of heat economy, an elongated furnace is unfavourable, because of the considerable losses by radiation. Moreover the problem of heating the reaction mixture by radiant heat, especially by electric heating resistances located inside the furnace itself, gives rise to considerable constructional difficulties in the case of an elongated furnace.

The present invention aims at obviating the foregoing drawbacks and at providing a furnace for the thermal production of magnesium, having an output capacity corresponding to the requirements of large-scale production, such as 250 kgs. and more of magnesium per day.

To this end the furnace of the present invention comprises a substantially cylindrical and substantially closed reaction chamber having a diameter at least equal to its length, a tangential opening in said chamber for supplying reaction mixture to and withdrawing reaction residue from said chamber, a condensation chamber rigidly secured to and adjacent to said reaction chamber in an axial direction and separated therefrom by a wall, an opening in said wall serving as a passage for the magnesium vapours generated in said reaction chamber, into said condensation chamber, electrical means for supplying heat to the interior of said reaction chamber, and means for imparting movement to said reaction and condensation chambers around the axis of the reaction chamber.

Further features of the invention will become apparent from the following description and will be defined in the appended claims.

In order that the invention may be more readily understood, reference is made to the accompanying drawing which illustrates diagrammatically and by way of example one embodiment thereof and in which:

Fig. 1 is a longitudinal section; and
Fig. 2 a cross section along the line a—a of Fig. 1.

A denotes a reaction chamber in the form of a horizontal cylinder having a diameter equal to or exceeding its length. Said reaction chamber A is provided with a lining B of ceramic material of good heat-insulating properties. The reaction mixture is introduced, and the solid reaction residues are discharged, through a single opening C which is fitted with a plug M and is located in the centre of the axis of the reaction chamber and is tangential to the periphery of the latter. Said opening C is widened, to a funnel, in the interior of the chamber so as to enable the reaction mixture to spread throughout the length of the chamber. The tangential arrangement of the opening C has the advantage that the charge material enters the furnace along a smooth path and as a steady stream, an advantage which is also obtained, for the discharge of the reaction residue, in the reverse direction. Moreover this tangential inlet arrangement also enables the whole of the basal segment of the funnel cone, or in other words, the imaginary apex of the funnel cone, to be brought relatively close to the axis of the reaction chamber, and thus the unbalance due to the provision of the charging funnel to be reduced.

The reaction chamber is preferably heated by means of electric heating resistances D of known type located in or near the axis of the reaction chamber. This arrangement is possible owing, on the one hand, to the compact form of the reaction chamber permitting cantilever radiator members D to be employed, and on the other, to the tangential arrangement of the opening C preventing the radiator member D from being damaged by the introduced reaction mixture.

The magnesium vapours generated by the reaction pass into a condensation chamber F through an opening E which is of small diameter in order to screen said condensation chamber as much as possible from the heat of the reaction chamber. The vapours enter the comparatively large condensation chamber F, designed as a cylinder, which is adapted to be cooled and heated, and is rigidly secured to and coaxial with the reaction chamber A. At the end remote from the reaction chamber, the condensation chamber F is provided with a tap hole G and with a vacuum branch H, also in axial alignment with the reaction chamber.

Owing to the risk of reaction between the magnesium produced and the constituents of the lining material of the condensation chamber, and also the risk of the hot magnesium metal damaging the joints, ceramic materials cannot be used for lining the chamber F. Metal being the only other material left for that purpose, such metal must fulfil the condition of being vacuum-proof and hydrogen-tight at the temperatures encountered, and also incorrodible by molten magnesium. For this latter reason, iron-nickel alloys, otherwise known as heat-resisting, are precluded from the outset. Most of the still remaining heat-resisting alloys, however, are not hydrogen-tight, or vacuum-tight. Nevertheless, it has been ascertained that iron-chromium alloys containing between about 5 and 30% and preferably between 6 and 8% of chromium and also containing, if desired, 0.5 to 1% of silicon and/or 0.7 to 2% of aluminum (for the purpose of reducing scaling) are able to meet all the requirements.

The magnesium is preferably condensed directly in a solid form, by suitably cooling the walls of the condensation chamber. When the furnace is stopped for emptying and re-charging, hydrogen is admitted through the vacuum branch H and the condensation chamber is heated to a temperature above the melting point of the magnesium, so that the latter can be drawn off in the molten state. For the purpose of heating the condensation chamber F, it is surrounded by a heating coil J. In order to minimise heat radiation losses, said condensation chamber F is also provided with a jacket K fitted with air valves L to accelerate cooling during the condensation stage.

We claim:

1. A furnace for the production of volatilizable metals by thermal reduction, comprising a substantially cylindrical substantially closed reaction chamber having a diameter at least equal to its length, a tangential opening in said chamber for supplying reaction mixture to and withdrawing reaction residue from said chamber, a condensation chamber rigidly secured and adjacent to said reaction chamber in an axial direction and separated therefrom by a wall, an opening in said wall serving as a passage for the metallic vapours, generated in said reaction chamber, into said condensation chamber, electrical means centrally disposed within said reaction chamber for supplying radiant heat to the reaction mixture, and means for imparting movement to said reaction and condensation chambers around the axis of the reaction chamber.

2. A furnace for the production of volatilizable metals by thermal reduction, comprising a substantially cylindrical substantially closed reaction chamber having a diameter at least equal to its length, a tangential opening in said chamber centrally disposed in relation to the length thereof, for supplying reaction mixture to and withdrawing reaction residue from said chamber, said opening being widened to a funnel inside said chamber in such a manner that the basal segment of said funnel closely approaches the axis of said chamber, a condensation chamber rigidly secured and adjacent to said reaction chamber in an axial direction and separated therefrom by a wall, an opening substantially central in said wall serving as a passage for the metallic vapours, generated in said reaction chamber, into said condensation chamber, electrical means centrally disposed within said reaction chamber for supplying radiant heat to the reaction mixture, and means for imparting movement to said reaction and condensation chambers around the axis of the reaction chamber.

3. A furnace for the production of volatilizable metals by thermal reduction, comprising a substantially cylindrical substantially closed reaction chamber having a diameter at least equal to its length, a tangential opening in said chamber for supplying reaction mixture to and withdrawing reaction residue from said chamber, a condensation chamber rigidly secured and adjacent to said reaction chamber in an axial direction and separated therefrom by a wall, an opening substantially central in said wall serving as a passage for the metallic vapours, generated in said reaction chamber, into said condensation chamber, rod-shaped radiating electrical resistor elements disposed in said reaction chamber adjacent to and parallel with the axis thereof, and means for imparting movement to said reaction and said condensation chambers around the axis of the reaction chamber.

4. A furnace for the production of volatilizable meals by thermal reduction, comprising a substantially cylindrical substantially closed reaction chamber having a diameter at least equal to its length, a tangential opening in said chamber for supplying reaction mixture to and withdrawing reaction residue from said chamber, a condensation chamber rigidly secured and adjacent to said reaction chamber in an axial direction and separated therefrom by a wall, an opening substantially central in said wall serving as a passage for the metallic vapours, generated in said reaction chamber, into said condensation chamber, electrical means centrally disposed within said reaction chamber for supplying radiant heat to the reaction mixture, means for imparting movement to said reaction and said condensation chambers around the axis of the reaction chamber and means for heating and cooling said condensation chamber.

HELLMUTH SELIGER.
OTTO BRETSCHNEIDER.
BERNHARD HUBALD.
WILLY KRÜGER.
GEORG TRUGLITZKA.

CERTIFICATE OF CORRECTION.

Patent No. 2,159,910.                         May 23, 1939.

HELLMUTH SELIGER, ET AL.

It is hereby certified that error appears in the printed specification of the above numbered patent requiring correction as follows: Page 2, first column, line 3, for the word "member" read members; line 17, for "aignment" read alignment; same page, second column, line 47, claim 4, for "meals" read metals; and that the said Letters Patent should be read with this correction therein that the same may conform to the record of the case in the Patent Office, Signed and sealed this 11th day of July, A. D. 1939.

(Seal)                                        Henry Van Arsdale

Acting Commissioner of Patents.